(12) United States Patent
Harnefors et al.

(10) Patent No.: US 10,389,129 B2
(45) Date of Patent: Aug. 20, 2019

(54) METHOD AND CONTROL SYSTEM FOR CONTROLLING A VOLTAGE SOURCE CONVERTER USING POWER-SYNCHRONIZATION CONTROL

(71) Applicant: ABB Schweiz AG, Baden (CH)

(72) Inventors: Lennart Harnefors, Eskilstuna (SE); Lidong Zhang, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/190,926

(22) Filed: Nov. 14, 2018

(65) Prior Publication Data
US 2019/0157870 A1 May 23, 2019

(30) Foreign Application Priority Data
Nov. 17, 2017 (EP) .................................. 17202372

(51) Int. Cl.
*H02M 7/48* (2007.01)
*H02J 3/34* (2006.01)
*H02M 7/5387* (2007.01)

(52) U.S. Cl.
CPC ........... *H02J 3/34* (2013.01); *H02M 7/53871* (2013.01)

(58) Field of Classification Search
CPC ...... H02J 3/01; H02J 3/24; H02J 3/34; H02M 2001/0012
See application file for complete search history.

(56) References Cited

U.S. PATENT DOCUMENTS

| 2011/0153113 A1* | 6/2011 | Harnefors | H02M 7/797 |
| | | | 700/298 |
| 2014/0067138 A1* | 3/2014 | Rodriguez Cortes | H02J 3/381 |
| | | | 700/286 |
| 2017/0009754 A1* | 1/2017 | Manfredi | F04B 13/00 |

FOREIGN PATENT DOCUMENTS

| CN | 105703381 A | 6/2016 |
| SE | 1200606 A1 | 10/2012 |
| WO | 2010022766 A1 | 4/2010 |

OTHER PUBLICATIONS

Remon, Daniel "An Active Power Synchronization Control Loop for Grid-Connected Converters" 2014 IEEE PES General Meeting Conference and Exposition, Jul. 31, 2014, pp. 1-5. (Year: 2014).*

(Continued)

*Primary Examiner* — Harry R Behm
(74) *Attorney, Agent, or Firm* — Whitmyer IP Group LLC

(57) ABSTRACT

A method of controlling a grid-connected voltage source converter, VSC, using power-synchronization control, wherein the method includes: determining a VSC current vector (i) based on a VSC phase angle (θ) which is determined based on an integration of a power control error, determining an active power producing current component ($i_d^{ref}$) of a reference current vector ($i_{ref}$) based on an active power reference ($P_{ref}$) for the VSC, determining the reference current vector ($i_{ref}$) based on the active power producing current component ($i_d^{ref}$), determining a damping component based on a virtual damping resistance ($R_a$), the reference current vector ($i_{ref}$) and the VSC current vector (i), determining a voltage vector (v) based on a VSC voltage magnitude (V) and the damping component, and controlling the VSC based on the voltage vector (v).

20 Claims, 2 Drawing Sheets

(56) References Cited

OTHER PUBLICATIONS

Alawasa, Khaled Mohammad, "Impedance and Damping Characteristics of Grid-Connected VSCs With Power Synchronization Strategy" IEEE Transactions on Power Systems, vol. 30, No. 2, Mar. 2015, pp. 952-961. (Year: 2015).*

European Search Report Application No. 17202372.3 Completed: May 7, 2018; dated May 23, 2018 9 Pages.

Jasim et al.: "Advanced Control Method for VSC-HVDC Systems Connected to Weak Grids" GE Energy Connection-Grid Solutions, 18th European Conference on Power Electronics and Applications, Sep. 2016, St. Leonard's Avenue, Stafford, United Kingdom, 10 pages.

Lidong Zhang et al: "Power-Synchronization Control of Grid-Connected Voltage-Source Converters", vol. 25, No. 2, published May 1, 2010, pp. 809-820.

Rouzbehi et al.: "Generalized Voltage Droop Strategy for Power Synchronization Control in Multi-Terminal DC Grids—an Analytical Approach," International Conference on Renewable Energy Research and Applications (ICRERA), published Nov. 2015, Palermo, Italy, 7 Pages.

Yuan et al.: "An Improved Phase-Locked-Loop Control with Alternative Damping Factors for VSC Connected to Weak AC System", Hindawi Publishing Corporation, Journal of Control Science and Engineering, vol. 2016, Article ID 9537342, Copyright © 2016, 14 pages. http://dx.doi.org/10.1155/2016/9537342.

Zhang Weiyi, et al: Frequency support characterstics of grid-interactive power converters based on the synchronous power controller IET Renewable Power Generation, The Institution of Engineering and Technology, Michael Faraday House, Six Hill Way, Stevenage, Herts. SG1 2AY, United Kingdom, vol. 11, vol. 4. Published Mar. 15, 2017, pp. 470-479.

* cited by examiner

METHOD AND CONTROL SYSTEM FOR CONTROLLING A VOLTAGE SOURCE CONVERTER USING POWER-SYNCHRONIZATION CONTROL

TECHNICAL FIELD

The present disclosure generally relates to voltage source converter control.

BACKGROUND

Power-synchronization control (PSC), also known as synchronous-machine emulating control or virtual synchronous machine, was originally invented for the control of an HVDC Light transmission where both terminals were situated in very weak ac networks. PSC is disclosed in EP2319170. The method is similar, but not identical, to the virtual synchronous machine. PSC can be used for any grid-connected voltage-source converter (VSC), not just HVDC.

The name PSC refers to how the method achieves synchronization to the grid; via the control of the active power. PSC therefore does not utilize a phase-locked loop (PLL). PSC is effective for connection to weak grids, with a short-circuit ratio (SCR) below 2. However, it gives a poorly damped closed-loop system for connection to a strong grid. In that case, the traditional method of vector current control (VCC) with outer loops, including a PLL, is preferable.

In a situation where the SCR is known to vary within a wide range, including SCR<2, there are currently two options.

1. Tune the PSC power-control gain on-line as a function of the SCR.
2. Make a switchover between PSC and VCC at a predetermined SCR.

Neither option is desirable. The preferred situation is to have a control system that is robust to the SCR.

LIDONG ZHANG ET AL: "Power-Synchronization Control of Grid-Connected Voltage-Source Converters", IEEE TRANSACTIONS ON POWER SYSTEMS, IEEE SERVICE CENTER, PISCATAWAY, N.J., US, vol. 25, no. 2, 1 May 2010 (2010 May 1), pages 809-820, XP011297020, ISSN: 0885-8950, discloses VSC-based power-synchronisation control. The power control error is converted to a frequency deviation, which is then integrated to an angle increment. The output signal supplies the angle to transform the voltage reference from the converter dq frame to the stationary frame.

ZHANG WEIYI ET AL: "Frequency support characteristics of grid-interactive power converters based on the synchronous power controller", IET RENEWABLE POWER GENERATION, THE INSTITUTION OF ENGINEERING AND TECHNOLOGY, MICHAEL FARADAY HOUSE, SIX HILLS WAY, STEVENAGE, HERTS. SG1 2AY, UK, vol. 11, no. 4, 15 Mar. 2017 (2017 Mar. 15), pages 470-479, XP006061208, ISSN: 1752-1416, DOI: 10.1049/IET-RPG.2016.0557 discloses a synchronous active power control solution for grid-interactive converters, as a way to emulate synchronous generators for inertia characteristics and load sharing.

SUMMARY

In view of the above, an object of the present disclosure is to provide a method of controlling a voltage source converter which solves, or at least mitigates, the problems of the prior art.

There is hence according to a first aspect of the present disclosure provided a method of controlling a grid-connected voltage source converter, VSC, using power-synchronisation control, wherein the method comprises: determining a VSC current vector based on a VSC phase angle which is determined based on an integration of a power control error, determining an active power producing current component $i_d^{ref}$ of a reference current vector based on an active power reference for the VSC, determining the reference current vector based on the active power producing current component, determining a damping component based on a virtual damping resistance, the reference current vector and the VSC current vector, determining a voltage vector based on a VSC voltage magnitude and the damping component, and controlling the VSC based on the voltage vector.

By determining the active power producing current component $i_d^{ref}$ based on the active power reference, a robust closed-loop system may be provided for strong grids. The improvement compared to traditional power-synchronisation control is gained by a pole-zero cancellation that reduces the closed active-power control loop dynamics from a third-order system to a first-order system. Additionally, the damping performance for weak grids is maintained, or even improved, compared to traditional PSC. Hereto, robust control irrespective of SCR may be provided.

The method may thus advantageously be used in both weak and strong grids.

The active power control error is the difference between an active power output from the VSC and the active power reference.

The VSC voltage magnitude is typically predetermined and can be set to be constant. Alternatively the VSC voltage magnitude can be set to change dynamically, using a specific control loop for this purpose.

According to one embodiment the active power producing current component is determined based on setting it proportional to the active power reference.

The active power producing current component may be the real value current component of the reference current vector in the dq-frame.

According to one embodiment the active power producing current component $i_d^{ref}$ is determined by $$i_d^{ref} = \frac{P_{ref}}{\kappa V}$$

where and $P_{ref}$ is the active power reference for the VSC, κ is a space-vector scaling constant, and V is the VSC voltage magnitude.

The space-vector scaling constant K may for example be determined by $$\kappa = \frac{3}{2K^2}$$

where K is a vector scaling constant. κ is hence a modified vector scaling constant. The vector scaling constant K can be arbitrarily chosen, but K=1 for peak-value scaling and K=1/√2 for rms-value scaling are common choices.

One embodiment comprises transforming the voltage vector to a stationary frame using the VSC phase angle to obtain a transformed voltage vector, wherein the controlling involves using the transformed voltage vector to control the VSC.

The stationary frame may be the αβ-frame.

One embodiment comprises determining a reactive power producing current component of the reference current vector using low-pass filtering of an imaginary part of the VSC current vector, wherein the reference current vector is further determined based on the reactive power producing current component.

The reactive power producing current component may be the imaginary value current component of the reference current vector in the dq-frame.

According to one embodiment the damping component is determined by determining a current error vector based on the reference current vector and the VSC current vector, and multiplying the virtual damping resistance with the current error vector.

The current error vector may be determined by subtracting the reference current vector from the VSC current vector or subtracting the VSC current vector from the reference current vector.

According to one embodiment the VSC current vector is determined by transforming a stationary VSC current vector, obtained by measurement, using the VSC phase angle.

There is according to a second aspect of the present disclosure provided a computer program comprising computer code which when executed by processing circuitry of a control system causes the control system to perform the method according to the first aspect.

There is according to a third aspect of the present disclosure provided a control system for controlling a grid-connected voltage source converter, VSC, using power-synchronisation control, wherein the control system comprises: a storage medium comprising computer code, and processing circuitry, wherein when the computer code is executed by the processing circuitry, the control system is configured to: determine a VSC current vector based on a VSC phase angle which is determined based on an integration of a power control error, determine an active power producing current component of a reference current vector based on an active power reference for the VSC, determine the reference current vector based on the active power producing current component, determine a damping component based on a virtual damping resistance, the reference current vector and the VSC current vector, determine a voltage vector based on a VSC voltage magnitude and the damping component, and control the VSC based on the voltage vector.

According to one embodiment the control system is configured to determine the active power producing current component based on setting it proportional to the active power reference.

According to one embodiment the real value current component is determined by $$i_d^{ref} = \frac{P_{ref}}{\kappa V}$$

where $P_{ref}$ is the active power reference for the VSC, K is a space-vector scaling constant and V is the VSC voltage magnitude.

According to one embodiment the processing circuitry is configured to transform the voltage vector to a stationary frame using the VSC phase angle to obtain a transformed voltage vector, wherein the control system is configured to control the VSC using the transformed voltage vector.

According to one embodiment the control system is configured to determine a reactive power producing current component of the reference current vector using low-pass filtering of an imaginary part of the VSC current vector, wherein the reference current vector is further determined based on the reactive power producing current component.

According to one embodiment the damping component is determined by determining a current error vector based on the reference current vector and the VSC current vector, and by multiplying the virtual damping resistance with the current error vector.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
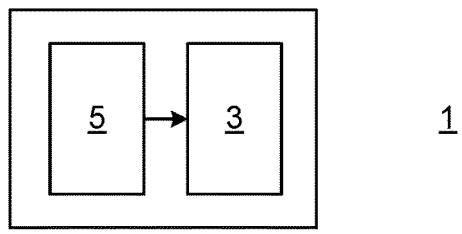
FIG. 1 schematically shows an example of a control system for controlling a grid-connected VSC using power-synchronisation control.

FIG. 1 shows an example of a control system 1 for controlling a grid-connected VSC using power-synchronisation control. The control system 1 comprises processing circuitry 3 and a storage medium 5.

The processing circuitry 3 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning VSC control.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
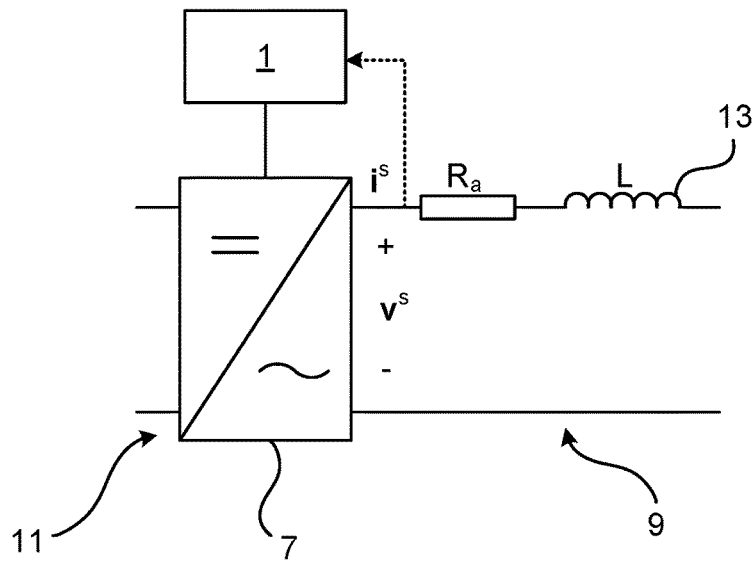
FIG. 2 schematically shows a circuit model of a grid-connected VSC controlled by the control system in FIG. 1.

FIG. 2 shows a grid-connected VSC 7. The control system 1 is configured to control the VSC 7. The VSC 7 is connected to an AC network 9 and to a DC network 11. An inductor 13 with inductance L symbolises the inductance of the grid. The inductance L is the sum of the filter inductance of the VSC 7 and the grid inductance. A virtual damping resistance $R_a$, also known as "active resistance" or "virtual resistance", which does not form part of the actual grid is also shown. The virtual damping resistance $R_a$ is used in the present method to increase the robustness of the control, in particular to provide damping in the event of transients.

The control system 1 is configured to obtain electric parameters from the grid. Such electric parameters may for example be VSC currents to obtain a measured stationary VSC current vector $i^s$ and VSC voltages to obtain a measured stationary VSC voltage vector $v^s$, used for determining an active power output P. With the term "stationary" is meant that the electric parameter in question is in a stationary frame. A current/voltage meter may for example be used to measure these parameters.

Figure 3:
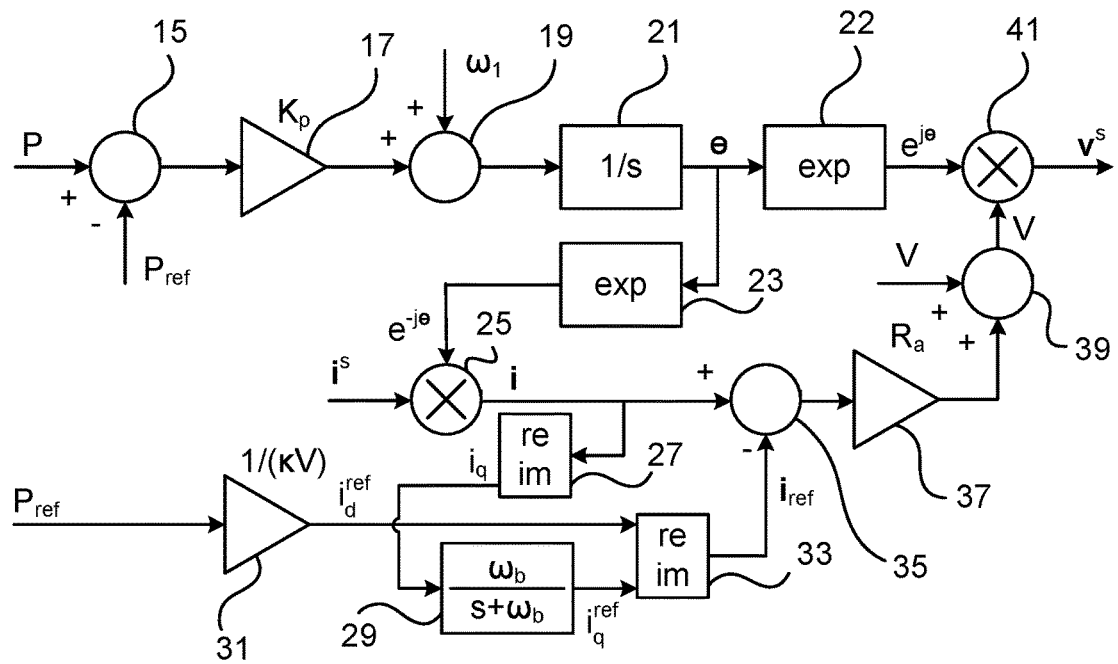
FIG. 3 schematically depicts a block diagram showing the control of a grid-connected VSC using the herein described power-synchronisation control.

FIG. 3 depicts a block diagram showing an example of the control of the grid-connected VSC 7 by means of the control system 1, using power-synchronisation control. The blocks of the block diagram are implemented by the processing circuitry 3 as hardware and/or software.

In a first block 15 a power control error is determined. The power control error is determined by the difference between the active power output P and an active power reference $P_{ref}$ for the VSC 7.

In a second block 17, the power control error is multiplied with a power control gain $K_p$, to obtain a scaled power control error. The power control gain $K_p$ is a constant. The power control gain $K_p$ typically has unit rad/(Ws) or similar, generally based on how the system is normalised.

In a third block 19, an angular frequency $\omega_1$, is added to the scaled power control error. The angular frequency $\omega_1$ is the angular frequency with which the space vectors of e.g. the measured stationary VSC current vector $i^s$ rotate in the stationary frame.

In an integration block 21, the sum of the scaled power control error and the angular frequency $\omega_1$ is integrated. In this manner, the VSC phase angle $\theta$ is obtained.

The output from the integration block 21, i.e. the VSC phase angle $\theta$ is sent to a first exponential block 22 to obtain $e^{j\theta}$.

The output from the integration block 21, i.e. the VSC phase angle $\theta$ is also sent to a second exponential block 23 to obtain $e^{-j\theta}$.

In a fourth block 25, the output from the second exponential block 23, i.e. $e^{-j\theta}$ is multiplied with the stationary VSC current vector $i^s$ as obtained by measurement. The stationary VSC current vector $i^s$ is thus transformed into a VSC current vector i in the dq-frame. The "s" denotes the stationary frame, in particular the $\alpha\beta$-frame.

The imaginary part $i_q$ of the VSC current vector i in the dq-frame is separated in a separation block 27 and input to a filtering block 29 The exemplified filtering block 29 provides a low-pass filtering of the imaginary part $i_q$ of the VSC current vector i in the dq-frame. The low-pass filtering of the imaginary part $i_q$ of the VSC current vector i determines the reactive power producing component $i_q^{ref}$ of a reference current vector $i_{ref}$. The low-pass filtering can be expressed as:

$$\frac{\omega_b}{s+\omega_b}i_q = i_q^{ref}$$

where $\omega_b$ is the bandwidth of the low-pass filter and s is the Laplace variable.

The active power reference $P_{ref}$ is scaled in a fifth block 31, whereby the active power producing current component $i_d^{ref}$ of the reference current vector $i_{ref}$ is determined. The scaling factor provided by the fifth block 31 is $1/\kappa V$, where K is a space-vector scaling constant. The scaling of the active power reference $P_{ref}$ provided in the fifth block 31 is set as the active power producing component $i_d^{ref}$ of the reference current vector $i_{ref}$. Hereto, $i_d^{ref}=P_{ref}/\kappa V$, and the reference current vector $i_{ref}$ is the sum of the active power producing current $i_d^{ref}$ and the reactive power producing current component $i_q^{ref}$, i.e. $i_{ref}=i_d^{ref}+ji_q^{ref}$. The reference current vector $i_{ref}$ may in particular be obtained in a combining block 33 where the active power producing component $i_d^{ref}$ and the reactive power producing component $i_q^{ref}$ are combined.

In a sixth block 35, a current error vector for the VSC current vector i in the dq-frame and the reference current vector $i_{ref}$ is determined. In particular, one of the VSC current vector i and the reference current vector $i_{ref}$ is subtracted from the other to obtain the current error vector.

In a seventh block 37, a damping component is determined. In particular the virtual damping resistance $R_a$ is multiplied with the current error vector to obtain the damping component $R_{a*}(i-i_{ref})$ or $R_{a*}(i_{ref}-i)$, the sign depending on the direction of the VSC current vector i.

In an eighth block 39, a voltage vector v is determined by adding the damping component and a VSC voltage magnitude V. Thus, the voltage vector $v=V+R_{a*}(i-i_{ref})$, or alternatively $V+R_{a*}(i_{ref}-i)$ is obtained. The VSC voltage magnitude V can for example be selected to be constant, e.g. 1 per unit (p.u.). Alternatively, the VSC magnitude V can be selected using a specific control loop for this purpose. The voltage magnitude V is a real component in the dq-frame. The voltage vector $v=V+R_{a*}(i_{ref}-i)$ is a real number in stationary state, because then $i_{ref}-i=0$. During transients $R_{a*}(i_{ref}-i)$ provides damping and may include a complex and a real component, the latter then being added to the real-valued voltage magnitude V in the dq-frame.

In a ninth block 41, the voltage vector v is transformed to the stationary frame, in particular the $\alpha\beta$-frame by multiplication with the output from the first exponential block 22, i.e. $e^{j\theta}$. A transformed voltage vector $v^s=Ve^{j\theta}$ is thus obtained. The transformed voltage vector $v^s$ is in the $\alpha\beta$-frame.

The transformed voltage vector $v^s$ is used for controlling the VSC 7. The control system 1 is thus configured to control the VSC 7 based on the transformed voltage vector $v^s$. This control may for example be by means of pulse width modulation (PWM), i.e. by using PWM for switching the switches, for example insulated gate bipolar transistors (IBGTs) of the VSC 7.

Figure 4A:
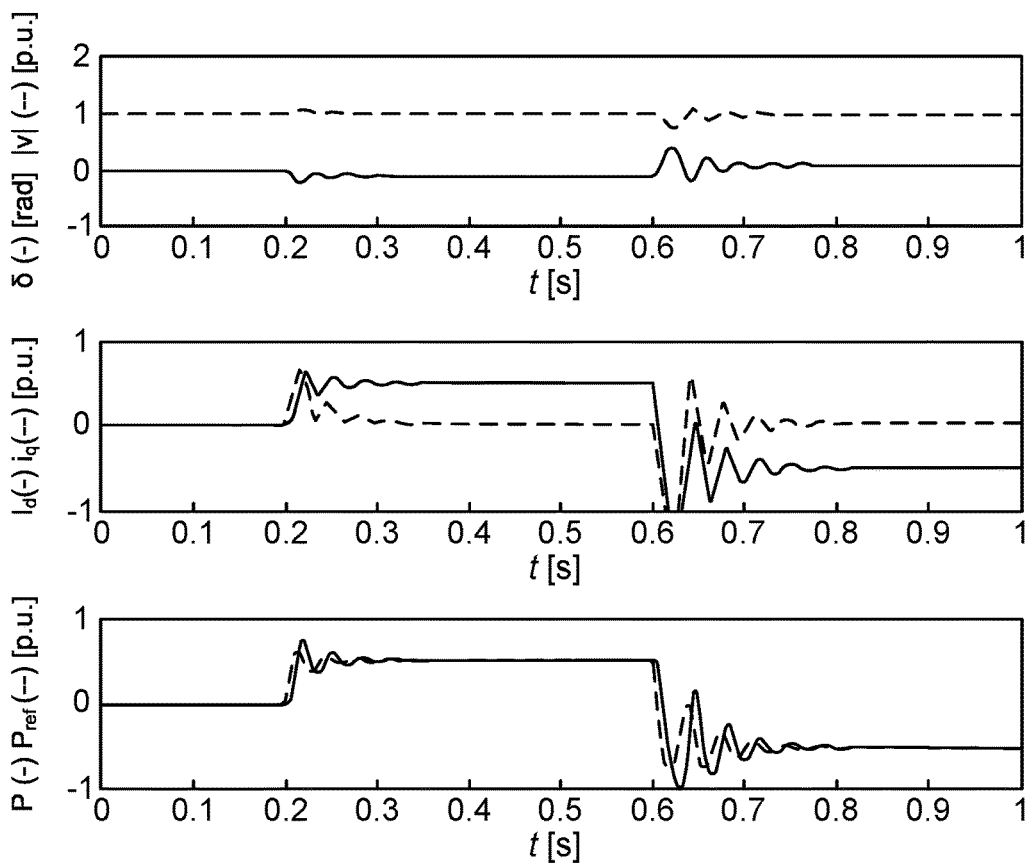
FIG. 4a shows the step response for various parameters for traditional power-synchronisation control.
Figure 4B:
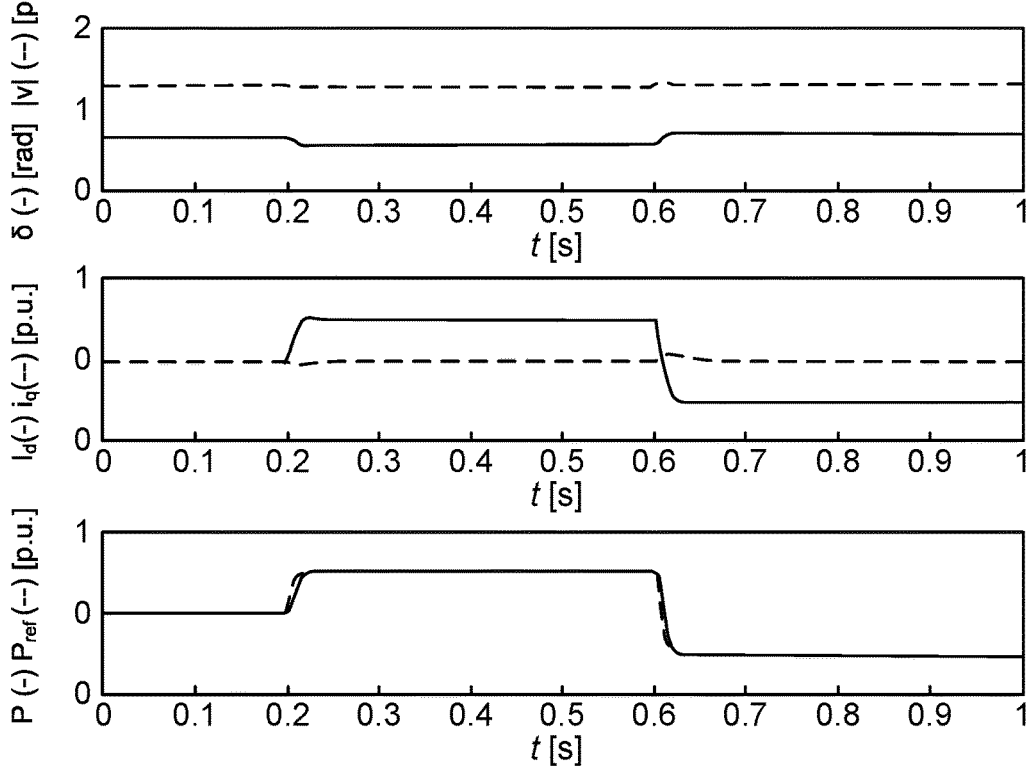
FIG. 4b shows the corresponding step response for the same parameters as in FIG. 4a but using the control method shown in FIG. 3.

FIG. 4a shows the step response for traditional power-synchronisation control in a simulation. In this simulation, the grid is strong with the inductance L=0.2 p.u., and the power control gain $K_p$ and the virtual damping resistance $R_a$ are set equal, in this example $K_p=R_a=0.2$ p.u. A step in the output power, on the dc side of the dc link of the VSC 7 from 0 to 0.5 p.u. is made at t=0.2 s, followed by a step to −0.5 p.u. at t=0.6 s. The uppermost graphs shows the angle δ, which is the angle difference between the VSC voltage and grid voltage, $i_d$ and $i_q$ in the middle graph are the active power producing current component and the reactive power producing current component of the VSC current vector i. The poor damping factor is evident. By contrast, referring to FIG. 4b, for the corresponding simulation with the herein described control method, the response obtained from a corresponding simulation is well damped.

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A method of controlling a grid-connected voltage source converter, VSC, using power-synchronisation control, wherein the method comprises the steps:
   determining a VSC current vector (i) based on a VSC phase angle (θ) which is determined based on an integration of a power control error,
   determining an active power producing current component ($i_d^{ref}$) of a reference current vector ($i_{ref}$) based on an active power reference ($P_{ref}$) for the VSC,
   determining the reference current vector ($i_{ref}$) based on the active power producing current component ($i_d^{ref}$),
   determining a damping component based on a virtual damping resistance ($R_a$), the reference current vector ($i_{ref}$) and the VSC current vector (i),
   determining a voltage vector (v) based on a VSC voltage magnitude (V) and the damping component, and
   controlling the VSC based on the voltage vector (v).

2. The method according to claim 1, wherein the active power producing current component ($i_d^{ref}$) is determined based on setting it proportional to the active power reference ($P_{ref}$).

3. The method according to claim 2, wherein the active power producing current component ($i_d^{ref}$) is determined by $$i_d^{ref} = \frac{P_{ref}}{\kappa V}$$

where $P_{ref}$ is the active power reference for the VSC, κ is a space-vector scaling constant and V is the VSC voltage magnitude (V).

4. The method according to claim 2, including transforming the voltage vector (v) to a stationary frame using the VSC phase angle (θ) to obtain a transformed voltage vector ($v^s$), wherein the controlling involves using the transformed voltage vector ($v^s$) to control the VSC.

5. The method according to claim 2, including determining a reactive power producing current component ($i_q^{ref}$) of the reference current vector ($i_{ref}$) using low-pass filtering of an imaginary part of the VSC current vector (i), wherein the reference current vector (v) is further determined based on the reactive power producing current component ($i_q^{ref}$).

6. The method according to claim 2, wherein the damping component is determined by determining a current error vector based on the reference current vector ($i_{ref}$) and the VSC current vector (i), and multiplying the virtual damping resistance with the current error vector.

7. The method according to claim 1, including transforming the voltage vector (v) to a stationary frame using the VSC phase angle (θ) to obtain a transformed voltage vector ($v^s$), wherein the controlling involves using the transformed voltage vector ($v^s$) to control the VSC.

8. The method according to claim 1, including determining a reactive power producing current component ($i_q^{ref}$) of the reference current vector ($i_{ref}$) using low-pass filtering of an imaginary part of the VSC current vector (i), wherein the reference current vector (v) is further determined based on the reactive power producing current component ($i_q^{ref}$).

9. The method according to claim 1, wherein the damping component is determined by determining a current error vector based on the reference current vector ($i_{ref}$) and the VSC current vector (i), and multiplying the virtual damping resistance with the current error vector.

10. The method according to claim 1, wherein the VSC current vector (i) is determined by transforming a stationary VSC current vector ($i^s$), obtained by measurement, using the VSC phase angle (θ).

11. A non-transitory computer-readable medium storing a computer program that includes computer code which when executed by processing circuitry of a control system causes the control system to perform the method according to the steps:
   determining a VSC current vector (i) based on a VSC phase angle (θ) which is determined based on an integration of a power control error,
   determining an active power producing current component ($i_d^{ref}$) of a reference current vector ($i_{ref}$) based on an active power reference ($P_{ref}$) for the VSC,
   determining the reference current vector ($i_{ref}$) based on the active power producing current component ($i_d^{ref}$),
   determining a damping component based on a virtual damping resistance ($R_a$), the reference current vector ($i_{ref}$) and the VSC current vector (i),
   determining a voltage vector (v) based on a VSC voltage magnitude (V) and the damping component, and
   controlling the VSC based on the voltage vector (v).

12. A control system for controlling a grid-connected voltage source converter, VSC, using power-synchronisation control, wherein the control system includes:
   a storage medium including computer code, and
   processing circuitry,
      wherein when the computer code is executed by the processing circuitry, the control system is configured to:
   determine a VSC current vector (i) based on a VSC phase angle (θ) which is determined based on an integration of a power control error,
   determine an active power producing current component ($i_d^{ref}$) of a reference current vector ($i_{ref}$) based on an active power reference ($P_{ref}$) for the VSC,
   determine the reference current vector ($i_{ref}$) based on the active power producing current component ($i_d^{ref}$),
   determine a damping component based on a virtual damping resistance ($R_a$), the reference current vector ($i_{ref}$) and the VSC current vector (i),
   determine a voltage vector (v) based on a VSC voltage magnitude (V) and the damping component, and
   control the VSC based on the voltage vector (v).

13. The control system according to claim 12, wherein the control system is configured to determine the active power producing current component ($i_d^{ref}$) based on setting it proportional to the active power reference ($P_{ref}$).

14. The control system according to claim 13, wherein the active power producing current component ($i_d^{ref}$) is determined by $$i_d^{ref} = \frac{P_{ref}}{\kappa V}$$

where $P_{ref}$ is the active power reference for the VSC, κ is a scaling constant and V is the VSC voltage magnitude (V).

15. The control system according to claim 13, wherein the processing circuitry is configured to transform the voltage vector (v) to a stationary frame using the VSC phase angle (θ) to obtain a transformed voltage vector ($v^s$), wherein the control system is configured to control the VSC using the transformed voltage vector ($v^s$).

16. The control system according to claim 13, wherein the control system is configured to determine a reactive power producing current component ($i_q^{ref}$) of the reference current vector ($i_{ref}$) using low-pass filtering of an imaginary part of the VSC current vector (i), wherein the reference current vector ($i_{ref}$) is further determined based on the reactive power producing current component ($i_q^{ref}$).

17. The control system according to claim 13, wherein the damping component is determined by determining a current error vector based on the reference current vector ($i_{ref}$) and the VSC current vector (i), and by multiplying the virtual damping resistance with the current error vector.

18. The control system according to claim 12, wherein the processing circuitry is configured to transform the voltage vector (v) to a stationary frame using the VSC phase angle (θ) to obtain a transformed voltage vector ($v^s$), wherein the control system is configured to control the VSC using the transformed voltage vector ($v^s$).

19. The control system according to claim 12, wherein the control system is configured to determine a reactive power producing current component ($i_q^{ref}$) of the reference current vector ($i_{ref}$) using low-pass filtering of an imaginary part of the VSC current vector (i), wherein the reference current vector ($i_{ref}$) is further determined based on the reactive power producing current component ($i_q^{ref}$).

20. The control system according to claim 12, wherein the damping component is determined by determining a current error vector based on the reference current vector ($i_{ref}$) and the VSC current vector (i), and by multiplying the virtual damping resistance with the current error vector.

* * * * *